United States Patent
Hymer

(10) Patent No.: US 6,840,660 B2
(45) Date of Patent: *Jan. 11, 2005

(54) HIGH SIGNAL LIGHTS FOR AUTOMOTIVE VEHICLES

(76) Inventor: Jeff L. Hymer, 1519 Ocean Dunes, Jupiter, FL (US) 33477

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,871

(22) Filed: Dec. 8, 1998

(65) Prior Publication Data

US 2001/0014025 A1 Aug. 16, 2001

Related U.S. Application Data

(63) Continuation-in-part of application No. 08/613,308, filed on Mar. 11, 1996, now Pat. No. 5,845,990.

(51) Int. Cl.[7] .................................................. B60Q 1/26
(52) U.S. Cl. ....................... 362/545; 362/493; 362/548; 340/467; 290/190.02
(58) Field of Search ................................ 362/548, 493, 362/545, 541, 540, 457, 485, 227, 234, 236, 237, 240, 242, 243, 244, 251, 543, 544; 340/467, 464, 478; 290/190.02; 296/190.02

(56) References Cited

U.S. PATENT DOCUMENTS

| | | | | |
|---|---|---|---|---|
| 1,300,893 A | * | 4/1919 | Stover | 340/467 |
| 2,486,476 A | * | 11/1949 | Kelley | 362/493 |
| 2,932,727 A | * | 4/1960 | Larsen | 362/184 |
| 3,005,089 A | * | 10/1961 | Robbins | 362/548 |
| 4,201,415 A | * | 5/1980 | Suchanek | 296/190.02 |
| 5,388,035 A | * | 2/1995 | Bodem, Jr. | 362/545 |
| 5,632,551 A | * | 5/1997 | Roney et al. | 362/485 |
| 5,688,036 A | * | 11/1997 | Marshall et al. | 362/485 |
| 5,877,682 A | * | 3/1999 | Groeller | 340/479 |

* cited by examiner

Primary Examiner—Stephen Husar
Assistant Examiner—James W Cranson
(74) Attorney, Agent, or Firm—James M. Deimen

(57) ABSTRACT

A device for an automotive vehicle to signal braking, deceleration, turning of the vehicle or an emergency situation. The device has two bodies facing rearwardly, mounted near the top of the back or the highest point of the vehicle adjacent the sides of the vehicle. Each body has a base and a cover with translucent lenses. Light sources and reflectors are disposed on the base for illuminating the lenses to create the signaling as required. Lighting one or more lenses in the cover indicate braking while lighting an arrow shaped lens in the cover and a side lens facing out from the vehicle indicate intended turning. The light transmitted through the lenses in the cover is directed downwardly either by a downward tilt to the cover or by directional configurations formed on the lenses. The lenses signifying braking are formed from red material while the arrow shaped and side lenses signifying turning are formed from red or yellow material. The device can be powered directly from the vehicle's electrical system or from a separate back-up battery that can be trickle charged as the vehicle is operating. A deceleration sensor such as a piezo electric crystal also operates the braking signals. An auxiliary switch near the back of the vehicle activates the turn indicators to operate in an intermittent emergency mode.

8 Claims, 3 Drawing Sheets

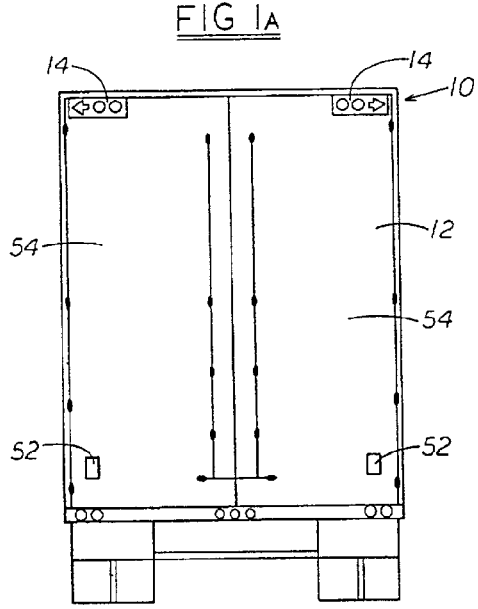
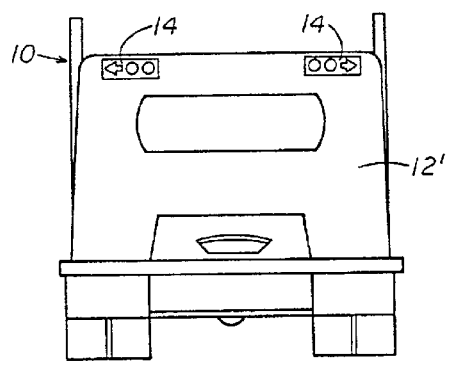
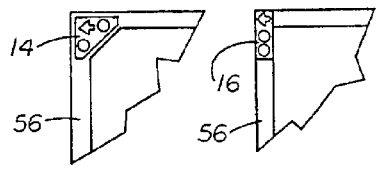
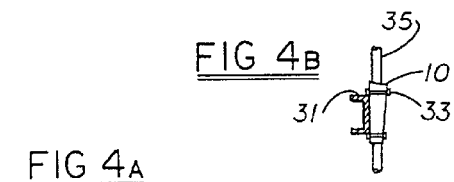
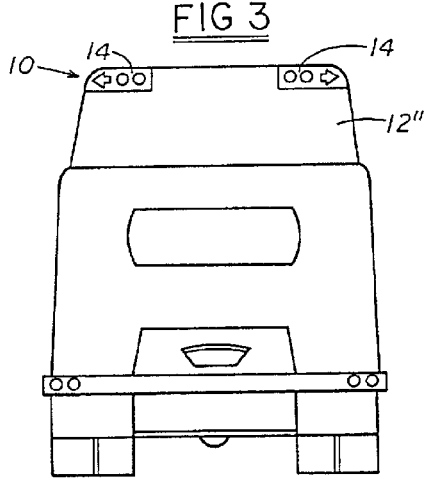
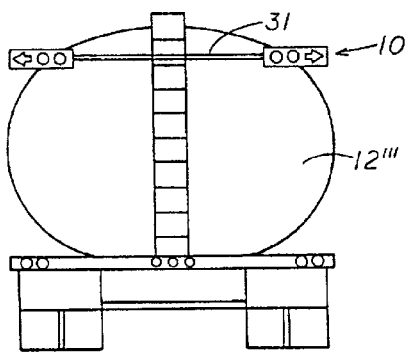
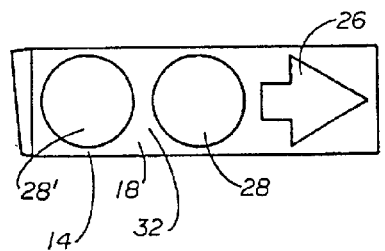

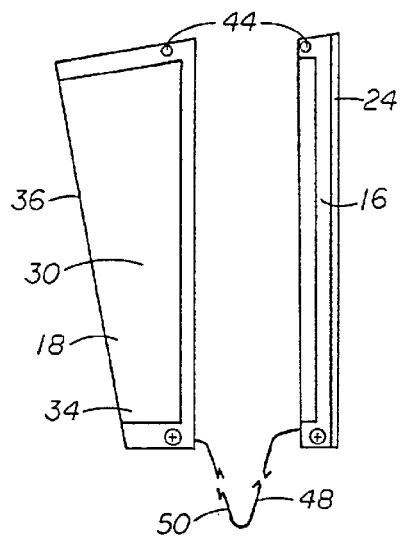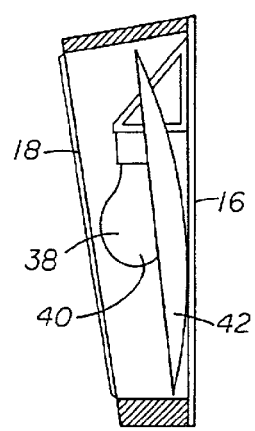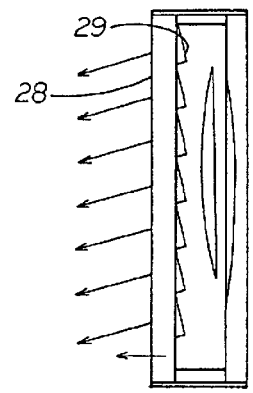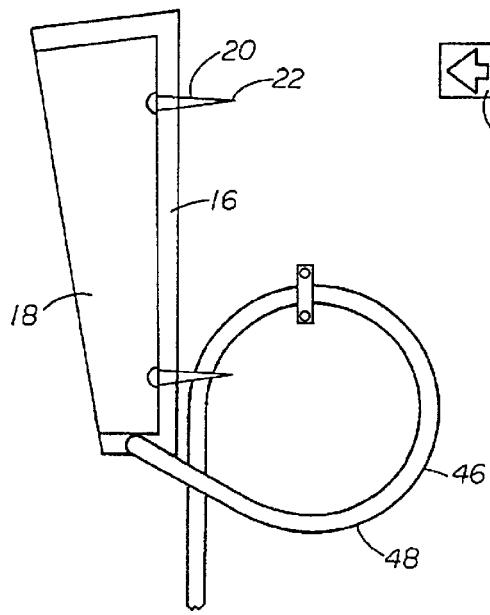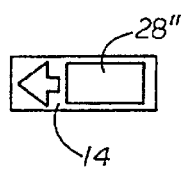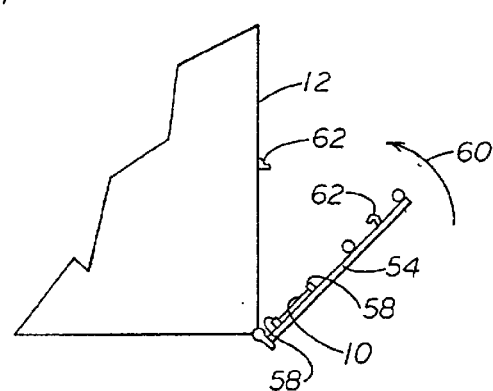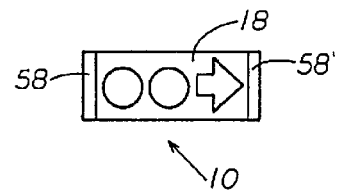

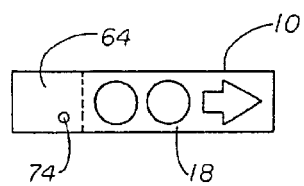
FIG 11
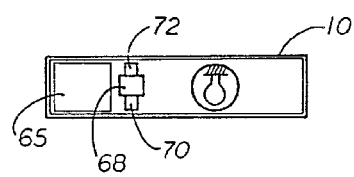
FIG 12
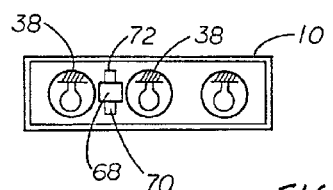
FIG 13
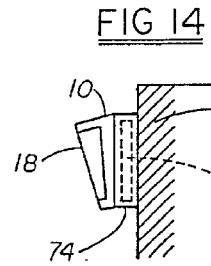
FIG 14
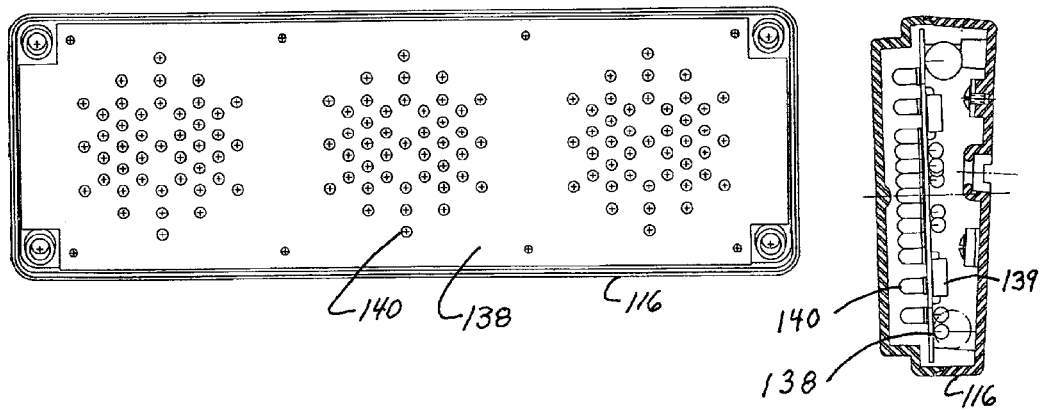
FIG. 15
FIG. 16

HIGH SIGNAL LIGHTS FOR AUTOMOTIVE VEHICLES

This application is a continuation-in-part of application Ser. No. 08/613,308 filed Mar. 11, 1996, now U.S. Pat. No. 5,845,990 issued Dec. 8, 1998.

BACKGROUND OF THE INVENTION

The field of the invention pertains to automotive vehicle signal lights. In particular, the invention pertains to signal lights and a method of using the signal lights to signal the braking of an automotive vehicle as well as indicating the intention to turn in a certain direction. The signal lights should have the capability of being seen from a distance, ideally reducing the number of collisions at the rear of the vehicle.

Attempts have been made to mount lights in visible locations. In the past, a high mount rear tail light to indicate braking has been used. This type of light has been used on passenger vehicles and is generally mounted in the center back of the vehicle at the lower edge of the back window. Some attempts have been made to place the high mount tail light at the middle of the top edge of the back window. However, positioning of high mount signal lights on commercial vehicles for braking has been noticeably limited. Further, indication of intent to turn the vehicle has not been accomplished with signals mounted at a high position.

For the year of 1994, the State of Michigan alone, reported 4,441 rear end collisions for the category including large trucks, buses, hazardous material carriers, and vehicles having at least two axles and six or more tires. Clearly, better signaling is needed, particularly for commercial vehicles.

Some of the previous attempts to position a relatively high tail light are as follows:

U.S. Pat. No. 5,211,466 discloses a vehicle rear signal light assembly for mounting above the rear window of an automobile.

U.S. Pat. No. 3,225,185 discusses a mounting for a marker light on a truck trailer.

U.S. Pat. No. 2,400,655 shows a guide for public safety of vehicles and pedestrians.

U.S. Pat. No. 3,564,497 teaches a light and horn vehicle signaling system for a truck trailer.

U.S. Pat. No. 4,297,675 discloses an underdeck supplemental right turn signal for semitrailers.

U.S. Pat. No. 4,800,471 shows a brake light attachment for use with a trailer hitch.

U.S. Pat. No. 4,751,493 teaches a kit for retrofitting automobiles with deceleration warning lights.

U.S. Pat. No. 3,440,415 shows a trailer interior and exterior lighting system.

U.S. Pat. No. 3,956,632 discusses a multiple purpose oscillating arm electromechanical vehicle signal device.

U.S. Pat. No. 5,073,768 discloses a multiple array of signal lights mounted below a truck tailgate.

U.S. Pat. No. 4,622,494 teaches a signaling device mounted below a bus rear window.

U.S. Pat. No. 5,245,251 shows a daytime running light convenience feature.

However, none of the above patents teach separate turning, braking and emergency signal lights mounted near the highest point of the vehicle and adjacent the sides of the vehicle. Thus, no known device exists to signal: braking, the intention of turning, sudden deceleration and an emergency to a distant viewer. The need exists for devices to be mounted in separate high locations to indicate braking, the intention of turning, sudden deceleration and an emergency.

SUMMARY OF THE INVENTION

The invention is directed to signal lights for indicating braking and for indicating intended turning in a certain direction. The signal lights are also used for signaling sudden deceleration of the vehicle and an emergency. Essentially, the invention comprises a device comprising two separate bodies that are each positioned adjacent opposite sides of the vehicle just lower than the highest point on the vehicle or attached trailer. Therefore the bodies are positioned near the top of the vehicle, trailer or an air dam/fairing attached to either. Hereafter in the interest of simplicity, the vehicle, the trailer or an air dam/fairing attached to either, will all be referred to as the vehicle.

Each body has a base that is attached to the vehicle. A weather proof connector is emplaced between the base and the vehicle. The base contains lighting sources and reflectors to concentrate and direct the light radiating from the lighting sources.

A cover fits over the base and encloses and protects the lighting sources and reflectors contained on the base. Moreover, the cover is provided with a tethering cable to keep the cover nearby its position. The tethering of the cover allows for maintenance of the lighting sources without the worry of dropping the cover to the ground and potentially damaging it.

Each cover has several translucent colored lenses disposed on the front of the cover. One lens is arrow shaped and is nearest to the outside. This lens is yellow in color and when lit, indicates the intention of the vehicle operator to turn the vehicle in that direction. Other lens or lenses on the cover have circular or rectangular shapes and are of a red color to indicate braking of the vehicle. The side of the cover nearest the side of the vehicle also has a yellow lens to indicate intended turning. The yellow lights may alternatively be red depending on governmental regulations.

The cover is tilted inwardly from the top of the body towards the bottom. This downward tilt angles the light from the lenses in a downwardly fashion, thereby more readily alerting drivers of following vehicles when the lenses are lit. Alternatively, the lenses can be configured to direct the light downwardly by using ribs in a designed pattern to achieve the same result. By locating the lights high with the slight tilt the lights stay relatively clean and protected from road splash and debris.

The signals are connected to existing vehicle electrical circuits. Accordingly, the braking signals in each body are wired to the brake pedal circuit. Therefore, when the vehicle operator actuates the brake pedal, not only do the regular brake lights light, the braking signals on the covers of both bodies of the device are activated and lighted. Correspondingly, the indication of intention to turn signal on the front and side of either body is also wired to the electrical circuit that is activated by the vehicle operator moving the turn signal to indicate either an impending left or right turn.

The operation of the vehicle's existing emergency flashers also operates the turning signals of both of the bodies of the invention in the same intermittent manner. Further, for even greater safety considerations, an auxiliary switch is provided near the back of the vehicle. The auxiliary switch allows manual operation of the turning indicators in the emergency mode from outside of the vehicle without the driver needing to return to the front of the vehicle.

The necessary action required to achieve the operation of the signal lights of the invention is triggered by the activation of current vehicle pedals or switches. No additional thought or action is required of the operator, which may be particularly important in a situation requiring immediate action. Thusly, important information from the signal lights can be transmitted to a following driver several vehicles back whose view may be blocked by interspersed vehicles between the indicating vehicle and the following driver. Ideally, rear end collisions will be reduced by use of this invention as compared to the known signal lights and methods of use.

Initially, it is envisioned that the signal lights be wired into the existing lighting circuits. However, a battery can be provided to power the signal lights should the existing vehicle circuits fail. The battery can be of a trickle charge type to continually reserve energy when the vehicle is operational and thereby be fully charged in event of vehicle circuit failure.

As a further safety feature mercury switches or similar devices may be included as a part of the battery pack version to automatically close the circuit for emergency flashing. Thus, in the event of collision or roll-over, for example, the device can act as an emergency flasher despite failure of the existing vehicle lighting circuits.

The invention can advantageously be employed for installation on new vehicles. The invention is also useful to retrofit existing automotive vehicles, including cars. While directed to all types of automotive vehicles as discussed above, the invention herein disclosed is not limited thereto but has other uses such as for horsedrawn vehicles and human powered vehicles.

For a more complete understanding of the present invention, reference is made to the following detailed description when read in conjunction with the accompanying drawings wherein like reference characters refer to like elements throughout the several views.

BRIEF DESCRIPTION OF THE DRAWINGS

FIG. 1a illustrates an environmental view of the back of a truck trailer showing the device according to the invention;

FIG. 1b illustrates an alternative configuration of the device;

FIG. 1c illustrates a second alternative configuration of the device;

FIG. 2 illustrates a rear view of a truck cab with the invention;

FIG. 3 illustrates a rear view of a truck cab with an air dam, the device according to the invention installed on the air dam;

FIG. 4a illustrates a rear view of a tanker truck having the device according to the invention installed on a cross-arm;

FIG. 4b illustrates attachment of the cross-arm to the tanker truck;

FIG. 5 illustrates a perspective of the body of the device;

FIG. 6 illustrates an exploded side view of the body of FIG. 5;

FIG. 7a illustrates a cross-sectional view of the body of FIG. 5 showing a lighting source and a reflector;

FIG. 7b illustrates an alternative form of the body;

FIG. 8 illustrates a side view of the body with a fastener and an electric line/tether;

FIG. 9 illustrates a view of the cover of the body with a rectangular braking lens;

FIG. 10a illustrates in plan view a small portion of truck-trailer door with the device installed on the door;

FIG. 10b illustrates the device with protective pads installed;

FIG. 11 illustrates the external appearance of the device with a battery pack;

FIG. 12 illustrates schematically the circuit elements installed with the battery pack;

FIG. 13 illustrates schematically a second configuration for the circuit elements installed with the battery pack depicted in FIG. 14;

FIG. 14 illustrates in end view an alternative form of battery pack;

FIG. 15 is a cover off view of a light emitting diode version of the device; and FIG. 16 is a cross-section of the device of FIG. 15 showing the diode assembly.

DESCRIPTION OF THE PREFERRED EMBODIMENT

In FIG. 1, the device generally denoted as 10 is shown mounted to a vehicle 12. The device 10 comprises two physically separated bodies, each body 14 having a base 16 and a cover 18. Each body 14 is mounted at the back of the vehicle 12 slightly below the highest point of the vehicle 12 and adjacent the side of the vehicle 12. Each body 14 is mounted at the top of the door of the trailer as shown in FIG. 1a, or the surrounding frame 15 as shown in FIGS. 1b and 1c.

The base 16 has attachment means 20 to the vehicle. The attachment means 20 can be wood screws 22 as shown in FIG. 8, or nuts and bolts used with or without a U-channel as shown in FIG. 4b. A weather seal 24 as shown in FIG. 6 is disposed between the base 16 and the vehicle 12 to eliminate damage from water intrusion or entrapment. The cover 16 may be comprised of plastic and has multiple lenses 26, 28, 28' and 30 molded therein.

The placement of the body 14 is not limited to positioning on the door of a trailer. FIG. 2 shows placement of the body 14 near the roof of a vehicle 12', in this instance, a truck cab, while FIG. 3 depicts placement of the body near the top edge of an air dam 12" mounted on the truck cab. Placement of the body 14 can be applied to a tanker truck 12'" by employing a "U" channel 31 to hold the body 14 as depicted in FIG. 4. The "U" channel 31 is attachable to the tanker ladder 35 by brackets or "U" bolts 33 as best shown in FIG. 4.

In FIGS. 5, 6 and 7, the body 14 of the device 10 is shown. As described above, the body 14 has a base 16 and a cover 18 connected to the base 16. The cover 18 has an arrow shaped lens 26 of yellow or red translucent material and one or more circular lenses 28, 28' of red translucent material on the front surface 32 of the cover 18, which face rearwardly. The lens of red translucent material can be have a rectangular shape as shown in FIG. 9.

The arrow shaped lens 26 is disposed to be nearer the side of the vehicle 12 than the circular lens(es) 28, 28'. The side surface 34 of the cover has a second yellow translucent lens 30 as best seen in FIG. 6. The second yellow lens 30 faces sidewardly and is in near proximity to the arrow shaped lens 26.

The front surface 32 of the cover 18 inclines downwardly toward the vehicle 12 thereby being smaller in depth to the vehicle 12 at the bottom of the cover 18. This incline 36 projects the light from the lenses at a downward angle making the signal from a high vehicle more noticeable to other drivers. Alternatively, the lenses 28 can have directional configurations on the inside surface 29 of the lenses for concentrating and aiming the light as shown in FIG. 7b. The directional configurations are designed to present a substantial amount of light to the eyes of the viewers, the following drivers.

The body 14 is lit by illuminating means 38 contained in the body 14 as shown in FIG. 7. The illuminating means 38 can be an incandescent bulb 40 or other type of lighting source, such as fluorescent or solid state. A reflector 42 partially surrounds the light bulb 40 to intensify and direct the light rays from the light bulb 40. The illuminating means 38 is connected into the vehicle's electrical system. Consequently, when the standard brake lights are operated by the operator touching the brake pedal the lens 28 or lenses 28' signifying braking are also lit. Correspondingly, when the vehicle driver operates the standard turn signals, the lenses 26 and 30 are also lighted and are operated.

The cover 18 can be snap fitted to the base 16 or be pivoted about a pin 44 as in FIG. 6. The electrical connection to the vehicle's power source can be made through a plastic flex line 46 as shown in FIG. 8. The electric cable 46 can serve as a tether 48 to retain the cover 18 during servicing of the illuminating means 38. A separate plastic cable 50 fastened to the cover 18 and base 16 as shown in FIG. 6 can also function as the tether 48.

FIG. 9 illustrates an optional lens configuration wherein a relatively large rectangular lens 28" is substituted for the circular lenses 28 and 28' above. In FIGS. 10a and 10b protective pads 58 are mounted on the cover 18 to first make contact with the vehicle 12 side wall and thereby protect the device 10 when the door 54 is fully swung around as indicated by arrow 60 and latched 62 to the side wall.

In addition to the vehicle's power system, a trickle charge battery pack 64 can be attached to or inserted into the device 10 as shown in FIG. 11 to ensure power for emergency operation of the device. Either the device 10 can be made large enough to house the small rechargeable nickel-cadmium or lead-acid battery pack 64 and attendant trickle charge circuitry or preferably a multi-layer thin film battery 66 such as used in Polaroid® film packages may be used. In the latter case the thin film battery and attendant circuitry for retaining a charge need not appreciably add to the volume or depth of the device 10 but rather be a flat package on the back of the device 10 as shown in FIG. 14.

Each body 14 is connected to the vehicle's electric circuitry. However, an auxiliary switch 52 for emergency turn signal mode can be inserted in the circuit to operate the body 14 independently of the vehicle's standard signaling system. Such a switch 52 can be mounted low on the doors 54 as shown in FIG. 1a or low on the surrounding frame 56 in FIGS. 1b and 1c (not shown) within an adult's reach from the ground.

A sudden deceleration sensor can be mounted within the body 14 to sense a sudden impact and trigger the means for illuminating to illuminate the lenses. A piezo electric crystal properly positioned to be compressed between the cover 18 and base 16 or a mercury switch can operate the illuminating means 38 when a forceful impact from a roll-over or collision pushes the cover into the crystal and base 16 or throws the switch.

In FIGS. 11 and 12 the battery pack 64 comprises the battery 65 plus modules for trickle charging 68 the battery whenever the brake or turn signal lights are operated plus, as options, the emergency flasher 70 and the piezo electric circuitry or mercury switch 72 accident and collision sensors. There may also be a small light 74 to indicate the trickle charger is operational whenever the brake or turn signal light is energized.

FIG. 13 shows the modules for the trickle charger 68, emergency flasher 70 and mercury switch 72 are tucked in between and partially behind the illuminating means 38. By tucking the modules within available space the same base 16 and cover 18 can be used for versions of the device 10 with and without the modules. Moreover, as shown in FIG. 14 a thin film battery pack 66 can be a flat thin (about ⅜ inches thickness) plastic box affixed between the device 10 and the door 54 or frame 56.

The body 14 of the device 10 can be formed from any opaque, lightweight, strong material, such as plastic. Other materials such as aluminum or other lightweight corrosion resistant metals could also be advantageously employed. The lenses can be formed from a colorable translucent material, also lightweight and strong such as plastic. The circuitry employed is either standard automotive circuitry or circuitry designed to comply with standard automotive circuitry requirements.

Although described above in terms of brake lights and turn signals, other lights, in particular backup lights with clear lenses, may be added to the device with electrical connection to the backup lighting circuit of the vehicle. Thus, a clear or white light observed high up at the rear will instantly signal backing up to a plurality automobiles behind the vehicle.

FIGS. 15 and 16 illustrate the configuration for a multiple diode light version of the device 10. The base 116 has mounted therein a printed circuit board 138 having a plurality of light emitting diodes 140 mounted thereto in a pattern as shown with the electronic components 139 underneath the circuit board. The large plurality of light emitting diodes 140 provides a very long lifetime of use at low power before the light output is significantly affected by loss of diodes.

I claim:

1. A device for a first relatively tall commercial vehicle for signaling to a plurality of other vehicles of much lesser height following there behind comprising
   at least two bodies, each body having a base, and a cover joined to the base,
   means for attaching each base to the first vehicle, the two bodies being mountable adjacent to the top on the back of the first vehicle and adjacent to each side of the vehicle with the covers facing rearwardly, and
   a plurality of translucent lenses in each cover and a plurality of illumination means for illuminating each of said lenses selectably to signal to the plurality of following vehicles, said first vehicle having the two bodies mounted adjacent the top thereof at an elevation sufficient for viewing by a plurality of following vehicles arrayed serially behind the first vehicle.

2. The device of claim 1 wherein said illumination means each comprise a plurality of light emitting diodes set in an array to illuminate at least one lens.

3. The device of claim 2 comprising a printed circuit board positioned between the cover and the base in at least one body, said plurality of light emitting diodes mounted on the printed circuit board.

4. Vehicle signaling lights for signaling change of vehicle speed or direction from a first relatively tall commercial vehicle to a plurality of other vehicles of much lesser height following there behind comprising, at least one light adjacent the upper right rear corner on the back of the first relatively tall vehicle, at least one light adjacent the upper left rear corner on the back of the first relatively tall vehicle, each of said at least one light having a base and a cover enclosing the light, each of said at least one light located at an elevation sufficient for viewing by the plurality of following vehicles arrayed serially behind the first vehicle, and electric circuitry communicating from first vehicle driver controls to each of said at least one light whereby a first vehicle driver can selectably illuminate each or both of said at least one lights by applying the first vehicle brakes or turn signal switches.

5. The vehicle signaling lights of claim 4 wherein each of said at least one light is a single light combining the function of brake light and turn signal light.

6. The vehicle signaling lights of claim 4 wherein each of said at least one light comprises separately illuminateable brake light and turn signal light.

7. The vehicle signaling lights of claim 4 wherein said at least one light comprises a plurality of light emitting diodes set in an array to illuminate the at least one light.

8. The vehicle signaling lights of claim 7 comprising a printed circuit board having the array of light emitting diodes mounted on the printed circuit board.

* * * * *